(12) United States Patent
Yang et al.

(10) Patent No.: US 12,328,720 B2
(45) Date of Patent: Jun. 10, 2025

(54) UPLINK DATA PARSING METHOD, ELECTRONIC DEVICE, AND STORAGE MEDIUM

(71) Applicants: SUNWAVE COMMUNICATIONS CO., LTD., Hangzhou (CN); BTI WIRELESS LIMITED, Hongkong (CN); BRAVO TECH INC, La Mirada, CA (US)

(72) Inventors: Chunjiang Yang, Hangzhou (CN); Ke Tian, Hangzhou (CN); Gang Liang, Hangzhou (CN)

(73) Assignees: SUNWAVE COMMUNICATIONS CO., LTD., Hangzhou (CN); BTI WIRELESS LIMITED, Hong Kong (CN); BRAVO TECH INC, La Mirada, CA (US)

( * ) Notice: Subject to any disclaimer, the term of this patent is extended or adjusted under 35 U.S.C. 154(b) by 462 days.

(21) Appl. No.: 17/988,779

(22) Filed: Nov. 17, 2022

(65) Prior Publication Data
US 2023/0075780 A1 Mar. 9, 2023

Related U.S. Application Data

(63) Continuation of application No. PCT/CN2021/087418, filed on Apr. 15, 2021.

(30) Foreign Application Priority Data

Sep. 8, 2020 (CN) .......................... 202010933348.1

(51) Int. Cl.
*H04W 72/1268* (2023.01)
*H04W 24/10* (2009.01)
*H04W 48/20* (2009.01)

(52) U.S. Cl.
CPC ....... *H04W 72/1268* (2013.01); *H04W 24/10* (2013.01); *H04W 48/20* (2013.01)

(58) Field of Classification Search
None
See application file for complete search history.

(56) References Cited

U.S. PATENT DOCUMENTS 11,233,618 B2 * 1/2022 Wei .................. H04W 72/0446
11,528,731 B2 * 12/2022 Li .......................... H04L 1/1896

FOREIGN PATENT DOCUMENTS

| CN | 101084690 A | 12/2007 |
|---|---|---|
| CN | 103596277 A | 2/2014 |

(Continued)

OTHER PUBLICATIONS

European search report of EP21865529.8, Sep. 2023.
International Search Report of PCT/CN2021/087418.

*Primary Examiner* — Hong S Cho

(57) ABSTRACT

An uplink data parsing method, an electronic device, and a storage medium are provided. The method includes: in an uplink scheduling process, a PHY layer of a baseband processing unit receiving uplink configuration information transmitted by a MAC layer; the PHY layer receiving uplink baseband signals obtained from a plurality of physical cells; the PHY layer determining, according to a first UE record, whether uplink data of a UE to be parsed is correctly parsed in the uplink scheduling process; if yes, the uplink data of the UE to be parsed being not parsed any more in the uplink scheduling process. The first UE record includes an uplink data parsing result of the UE of which uplink data needs to be parsed in the uplink scheduling process.

20 Claims, 3 Drawing Sheets

(56) References Cited

FOREIGN PATENT DOCUMENTS

| | | | |
|---|---|---|---|
| CN | 103731884 | A | 4/2014 |
| CN | 104253640 | A | 12/2014 |
| CN | 104980382 | A | 10/2015 |
| CN | 107395268 | A | 11/2017 |
| CN | 108206726 | A | 6/2018 |
| CN | 108777857 | A | 11/2018 |
| CN | 112261672 | A | 1/2021 |
| WO | WO2020072106 | A1 | 4/2020 |

* cited by examiner

UPLINK DATA PARSING METHOD, ELECTRONIC DEVICE, AND STORAGE MEDIUM

CROSS-REFERENCE TO RELATED APPLICATIONS

This application is a continuation of international patent application No. PCT/CN2021/087418, filed on Apr. 15, 2021, titled "UPLINK DATA PARSING METHOD, ELECTRONIC DEVICE, AND STORAGE MEDIUM", which itself claims priority to Chinese patent application No. 202010933348.1, filed on Sep. 8, 2020, titled "UPLINK DATA PARSING METHOD, ELECTRONIC DEVICE, AND STORAGE MEDIUM". The contents of the above identified applications are hereby incorporated herein in their entireties by reference.

TECHNICAL FIELD

The present disclosure generally relates to a field of communication technology, and in particular, to an uplink data parsing method, an electronic device, and a storage medium.

BACKGROUND

Cell merging refers to a merging of multiple physical cells with the same frequency into a logical cell. The cell merging is particularly suitable for scenarios such as highways, high-speed railroads and indoor coverage in the 4th generation mobile communication technology (4G)/the 5th generation mobile communication technology (5G) coverage. The cell merging can significantly improve a capacity of cell coverage and enable network expansion and supplementation to be more flexible. The cell merging can reduce the number of cell switching, signaling interaction, and dropped calls caused by frequent switching. The cell merging can simplify neighbor relationship, lower the complexity of network planning, and improve user experience.

For a scenario of the cell merging, the logical cell is split into the multiple physical cells in a downlink, and the multiple physical cells are merged into the logical cell in an uplink. For all User Equipments (UEs) in the logical cell, a Distributed Unit (DU) does not distinguish exactly in which physical cell each UE is connected. Therefore, when an uplink baseband processing unit of the DU receives baseband signals from the multiple physical cells, the uplink baseband processing unit needs to try to demodulate and decode all UEs in each physical cell. All UEs need to be parsed in all physical cells at worst, which increases processing load of the uplink baseband processing unit several times compared to a scenario without the cell merging. When the number of physical cells to be merged is great, a conventional approach may even lead to a device unfeasible. Related technology needs to deploy a complete uplink physical layer in each Remote Unit (RU), so that each Remote Radio Head (RRH) has a physical layer and Media Access Control (MAC) capability, which increases cost and complexity of the RU, and increases amount of information for DU and RU interaction. In the scenario of the cell merging, null signals of the multiple physical cells need to be processed in an uplink reception. An uplink processing of the multiple physical cells is in forms such as radio frequency merging or baseband merging. The radio frequency merging would allow background noise to lift and reduce reception performance, which limits the number of cells for the radio frequency merging. The baseband merging would not reduce the reception performance, but would cause a multiplication of baseband processing load and greatly reduce product specification.

SUMMARY

The present disclosure provides an uplink data parsing method, an electronic device, and a storage medium, to at least solve a problem in related art that processing load of a baseband processing unit is great.

In a first aspect, the present disclosure provides an uplink data parsing method, which is applied to a base station including a logical cell merged by a plurality of physical cells. The base station includes a baseband processing unit and multiple remote radio units connected to the baseband processing unit. The base station is configured to perform Port Physical Layer (PHY layer) processing and MAC layer processing in the baseband processing unit. The method includes: in an uplink scheduling process, a PHY layer of the baseband processing unit receiving uplink configuration information transmitted by a MAC layer; the PHY layer receiving uplink baseband signals obtained from the plurality of physical cells; and the PHY layer determining, according to a first UE record, whether uplink data of the UE to be parsed is correctly parsed in the uplink scheduling process, if yes, the uplink data of the UE to be parsed being not parsed any more in the uplink scheduling process. The uplink configuration information includes parameter information of a UE of which uplink data needs to be parsed in the uplink scheduling process, and the first UE record includes an uplink data parsing result of the UE of which uplink data needs to be parsed in the uplink scheduling process.

In some embodiments, after the PHY layer determining, according to the first UE record, whether the uplink data of the UE to be parsed is correctly parsed in the uplink scheduling process, the method further includes: if no, the PHY layer querying a physical cell where the uplink data of the UE to be parsed is last correctly parsed according to a second UE record, and employing the parameter information of the UE to parse the uplink data of the UE to be parsed in target uplink baseband signals. The target uplink baseband signals are corresponding to the physical cell where the uplink data of the UE to be parsed is last correctly parsed, and the second UE record includes cell identifiers of physical cells where the uplink data of all UEs in the logical cell is last correctly parsed.

In some embodiments, the method further includes: in a case that the PHY layer queries no physical cell where the uplink data of the UE to be parsed is last correctly parsed according to the second UE record, the PHY layer employing the parameter information of the UE to parse the uplink data of the UE to be parsed in the uplink baseband signals corresponding to the plurality of physical cells; and in a case that the uplink data of the UE to be parsed is correctly parsed, the PHY layer updating the cell identifiers of physical cells where the uplink data of the UE to be parsed is correctly parsed into the second UE record, and the PHY layer updating the uplink data parsing result of the UE of which the uplink data is correctly parsed into the first UE record.

In some embodiments, the PHY layer employing the parameter information of the UE to parse the uplink data of the UE to be parsed in the uplink baseband signals corresponding to the plurality of physical cells includes: the PHY layer selecting physical cells in turn from the plurality of physical cells in a preset order, and the PHY layer employing the parameter information of the UE to parse the uplink data of the UE to be parsed in the uplink baseband signals corresponding to the selected physical cells until the plurality of physical cells have been traversed.

In some embodiments, the PHY layer employing the parameter information of the UE to parse the uplink data of the UE to be parsed in the uplink baseband signals corresponding to the selected physical cells includes: the PHY layer calculating a Physical Uplink Shared Channel (PUSCH) measurement corresponding to the UE, according to the uplink baseband signals corresponding to the selected physical cells, and the PHY layer determining whether the PUSCH measurement is greater than a preset threshold, if yes, the PHY layer employing the parameter information of the UE to parse the uplink data of the UE to be parsed in the uplink baseband signals corresponding to the selected physical cells; if no, the PHY layer not parsing the uplink data of the UE to be parsed in the uplink baseband signals corresponding to the selected physical cells.

In some embodiments, the PUSCH measurement is obtained based on either or both of a signal-to-noise ratio and reference signal received power.

In some embodiments, the method further includes: the PHY layer transmitting either or both of the uplink data of the UE to be parsed and the uplink data parsing result of the UE in the uplink scheduling process to the MAC layer, and the PHY layer ending the uplink scheduling process.

In some embodiments, the method further includes: when the uplink scheduling process is ended or a next uplink scheduling process is started, the PHY layer initializing the first UE record.

In a second aspect, the present disclosure provides an electronic device including a processor and a memory that stores a computer program running on the processor. The computer program is executed by the processor to implement the steps of the uplink data parsing method in the first aspect.

In a third aspect, the present disclosure provides a storage medium having stored a computer program. The computer program is executed by a processor to implement the steps of the uplink data parsing method in the first aspect.

Compared with related technologies, the uplink data parsing method, the electronic device, and the storage medium provided in the present disclosure solve the problem of the great processing load of the baseband processing unit, and reduce the load of the baseband processing unit.

The details of one or more embodiments of the present disclosure are set forth in the accompanying drawings and the description below. Other features, objects and advantages of the present disclosure will become apparent from the description, drawings and claims.

BRIEF DESCRIPTION OF THE DRAWINGS

The drawings illustrated herein are used to provide a further understanding of the present disclosure, constituting part of the present disclosure. Illustrative embodiments of the present disclosure and its description used for explain the present disclosure, does not construed as an undue qualification of the present disclosure. In the drawings.

DETAILED DESCRIPTION OF THE EMBODIMENT

Figure 1:
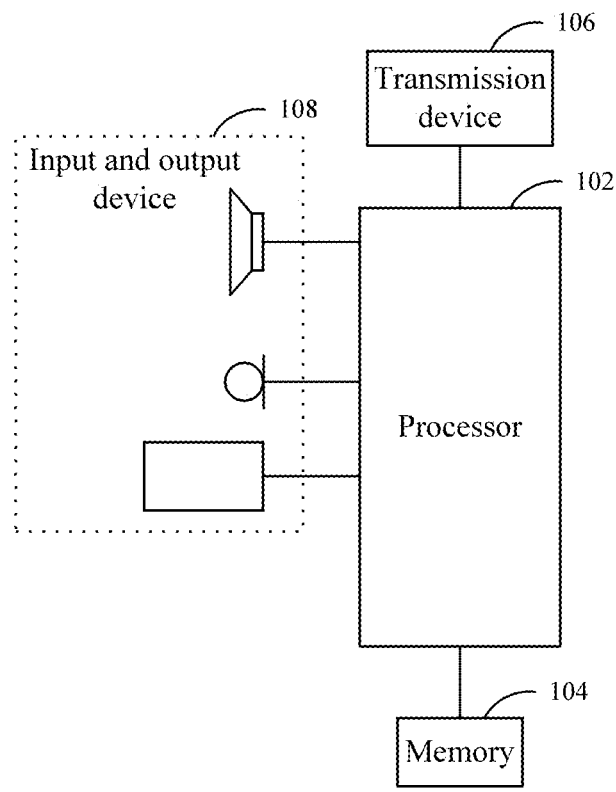
FIG. 1 is a block diagram of a hardware structure of a terminal for an uplink data parsing method in an embodiment of the present disclosure.

In order to make objects, technical solutions and advantages of the present disclosure more clearly understood, the present disclosure is described and illustrated in the following with reference to the accompanying drawings and embodiments. It should be understood that specific embodiments described herein are only used to explain the present disclosure and not intended to limit the present disclosure. All other embodiments obtained by those skilled in the art based on the embodiments of the present disclosure without making creative labor are within the scope of the present disclosure. It is also understood that although the efforts made in such development process may be complex and lengthy, some changes in design, manufacture or production based on the technical content disclosed in the present disclosure are only conventional technical means to those skilled in the art related to the content disclosed in the present disclosure and should not be construed as inadequate for the content disclosed in the present disclosure.

The reference to "embodiment" in the present disclosure means that with reference to the particular features, structures or characteristics described in the embodiments may be included in at least one embodiment of the present disclosure. The phrase "embodiment" appears in various positions in the description does not necessarily refer to the same embodiment, nor is it a separate or alternative embodiment that is mutually exclusive with other embodiments. It can be expressly and implicitly understood by those skilled in the art that the embodiments described in the present disclosure may be combined with other embodiments in the absence of conflict.

Unless otherwise defined, all technical and scientific terms used herein have the same meaning as a skilled person in the art would understand. The term "one", "a", "an", "the" and other similar words as used in the present disclosure do not indicate quantitative limitations, and they can be singular or plural. The terms "include", "comprise", "have", and any variation thereof, as used in the present disclosure, are intended to cover a non-exclusive inclusion. For example, processes, methods and systems, and products or devices including a series of steps or modules (units) are not limited to listed steps or units, but may include steps or units not listed, or may include other steps or units inherent in those processes, methods, products or devices. The terms "connection", "connected", "coupling", and other similar words as used in the present disclosure are not limited to physical or mechanical connections, but may include electrical connections, which can be direct connections or indirect connections. The term "plurality" in the present disclosure refers to two or more. "And/or" describes an association relationship between associated objects, indicating that there can be three kinds of relationships. For example, "A and/or B" can mean that A exists alone, A and B exist at the same time, and B exists alone. The character "/" indicates that the objects associated with each other are in an "or" relationship. The terms "first", "second", "third", etc. involved in the present disclosure are only configured for distinguishing similar objects, and do not represent a specific order of the objects.

Method embodiments provided in the present disclosure can be executed in a terminal, a computer, or a similar computing device. As an example of running on a terminal, FIG. 1 is a block diagram of a hardware structure of the terminal for an uplink data parsing method in an embodiment of the present disclosure. Referring to FIG. 1, the terminal can include one or more (only one is shown in FIG. 1) processors 102 (the processors 102 can include, but are not limited to, processing devices such as a Microcontroller Unit (MCU), a Field Programmable Gate Array (FPGA), etc.) and memories 104 for storing data. Alternatively, the terminal can also include a transmission device 106 and an input and output device 108 for communication functions. The structure shown in FIG. 1 is only schematic, and FIG. 1 does not limit the structure of the terminal. For example, the terminal can also include more or fewer components than that shown in FIG. 1, or have a different configuration from that shown in FIG. 1.

The memory 104 can be configured to store computer programs, such as software programs and modules of application software. For example, the memory 104 can store computer programs corresponding to the uplink data parsing method in an embodiment of the present disclosure. The processor 102 can implement the method by running a computer program stored in the memory 104, thereby performing various functional applications as well as data processing. The memory 104 can include a high-speed random memory, and may also include a non-volatile memory, such as one or more magnetic storage devices, flash memories, or other non-volatile solid-state memories. In some examples, the memory 104 can further include a memory that is remotely located relative to the processor 102, and the remote memory can be connected to the terminal via a network. Examples of the network can include, but are not limited to, the Internet, a corporate intranet, a local area network, a mobile communication network, and combinations thereof.

The present embodiment provides the uplink data parsing method, which is applied to a base station including a logical cell merged by a plurality of physical cells. The base station includes a baseband processing unit and multiple remote radio units connected to the baseband processing unit. The base station is configured to perform PHY layer processing and MAC layer processing in the baseband processing unit.

Figure 2:
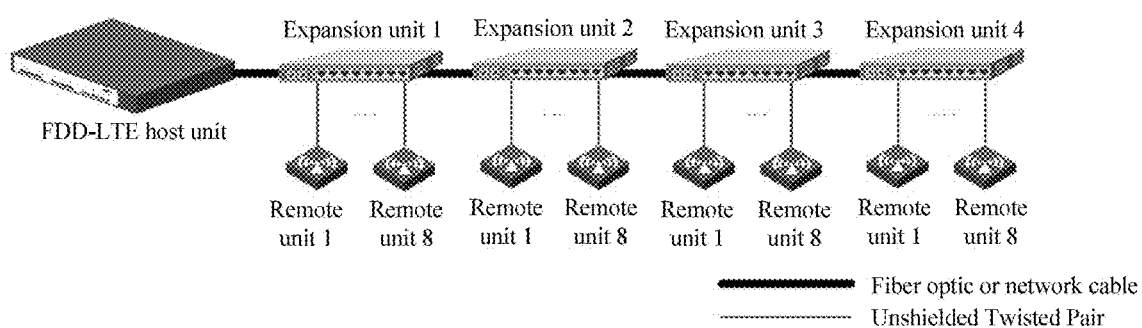
FIG. 2 is a schematic diagram of a base station with an architecture of DU, HUB, and RU in an embodiment of the present disclosure.

In the present embodiment, in a base station with an architecture of Building Baseband Unit (BBU) and Remote Radio Unit (RRU), the baseband processing unit can include the BBU, and the remote radio units can include the RRU. In a base station with an architecture of Distributed Unit (DU) and Radio Unit (RU), or with an architecture of the DU, HUB, and the RU, the baseband processing unit can include the DU, and the remote radio units can include the RU. The HUB is configured to extend a connecting port between the DU and the RU. FIG. 2 is a schematic diagram of the base station with the architecture of the DU, the HUB, and the RU in an embodiment of the present disclosure. Referring to FIG. 2, a Frequency Division Duplexing-Long Term Evolution (FDD-LTE) host unit can be equivalent to the DU, an expansion unit 1, an expansion unit 2, an expansion unit 3 and an expansion unit 4 can be equivalent to the HUB, several remote units can be connected to each expansion unit, and the remote units can be equivalent to the RU. Referring to FIG. 2, eight remote units can be connected to each expansion unit, and four expansion units can connect thirty-two expansion units to the FDD-LTE host unit in total. Up to thirty-two physical cells can be merged into the logical cell.

Figure 3:
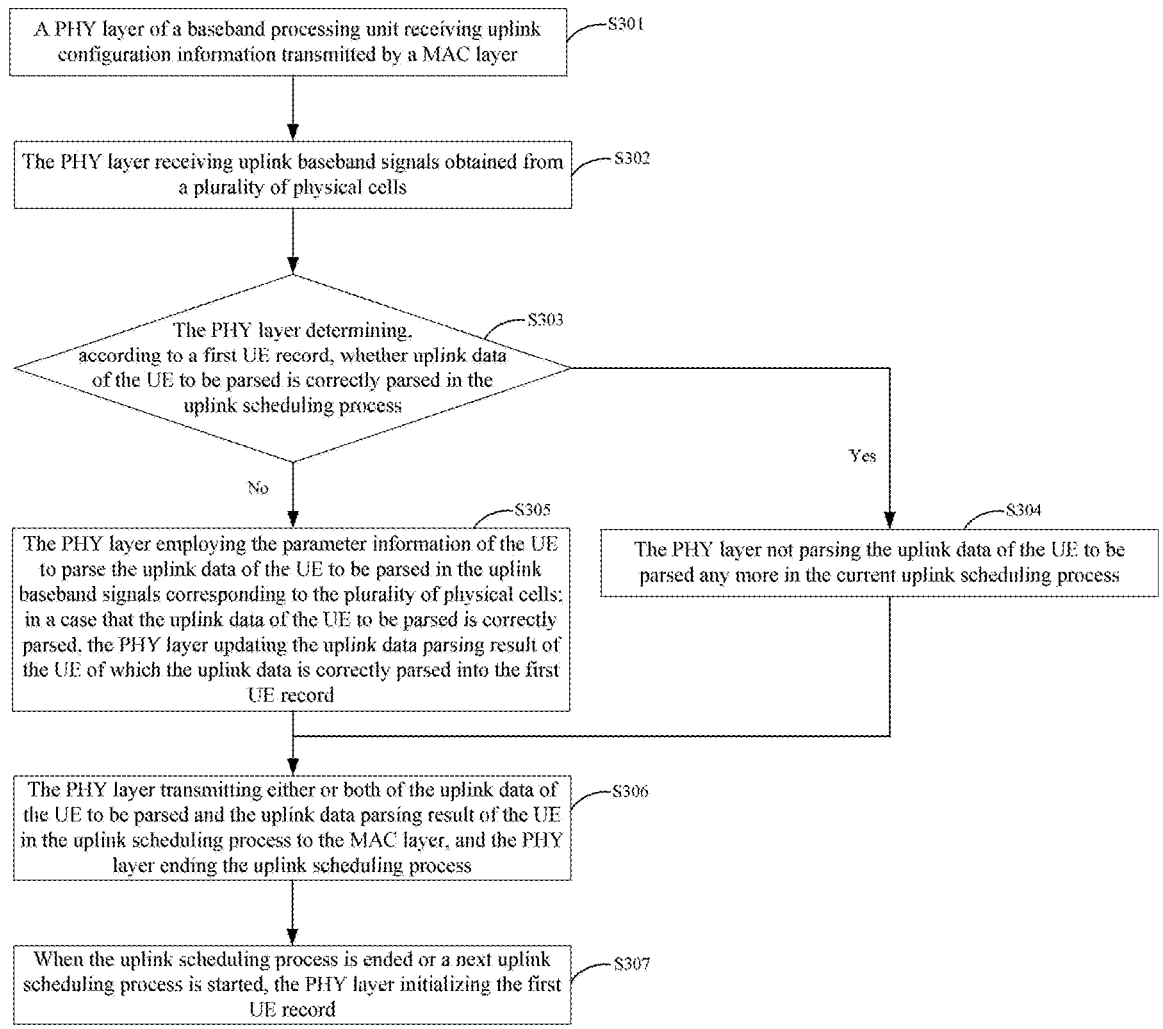
FIG. 3 is a flowchart of an uplink data parsing method in an embodiment of the present disclosure.

FIG. 3 is a flowchart of the uplink data parsing method in an embodiment of the present disclosure. Referring to FIG. 3, a process includes the following steps:

At step 301, in an uplink scheduling process, a PHY layer of a baseband processing unit receiving uplink configuration information transmitted by a MAC layer.

In the above step, the uplink configuration information includes parameter information of a UE of which uplink data needs to be parsed in the uplink scheduling process. The parameter information of the UE can be, for example, location information of a resource block of the UE of which uplink data needs to be parsed, etc. The parameter information of the UE can be obtained to provide a data basis for parsing the uplink data of the UE in the subsequent steps.

At step 302, the PHY layer receiving uplink baseband signals obtained from a plurality of physical cells.

In the above step, the PHY layer can receive uplink baseband signals of the plurality of physical cells. The plurality of physical cells can include all physical cells that have received signals transmitted from the UE, and each physical cell can be corresponding to a remote radio unit.

At step 303, the PHY layer determining, according to a first UE record, whether uplink data of the UE to be parsed is correctly parsed in the uplink scheduling process.

At step 304, when the PHY layer determines that the uplink data of the UE to be parsed is correctly parsed in the uplink scheduling process according to the first UE record, the PHY layer not parsing the uplink data of the UE to be parsed any more in the current uplink scheduling process, and the first UE record including an uplink data parsing result of the UE of which uplink data needs to be parsed in the uplink scheduling process.

In the above step 301 to step 304, after determining that the uplink data of the UE to be parsed is correctly parsed in the current uplink scheduling process according to the first UE record, the uplink data of the UE to be parsed can be not parsed any more in the current uplink scheduling process, avoiding a problem of great consumption resources of the baseband processing unit caused by repeatedly parsing the uplink data of the UE to be parsed result from traversing various physical cells.

In some embodiments, the uplink data parsing method can further include:

At step 305, in a case that the uplink data of the UE to be parsed is not correctly parsed, the PHY layer employing the parameter information of the UE to parse the uplink data of the UE to be parsed in the uplink baseband signals corresponding to the plurality of physical cells; in a case that the uplink data of the UE to be parsed is correctly parsed, the PHY layer updating the uplink data parsing result of the UE of which the uplink data is correctly parsed into the first UE record. In this way, the update of the first UE record can be achieved.

In some embodiments, the uplink data parsing method can further include:

At step 306, the PHY layer transmitting either or both of the uplink data of the UE to be parsed and the uplink data parsing result of the UE in the uplink scheduling process to the MAC layer, and the PHY layer ending the uplink scheduling process.

In the above step, after the uplink data of all UEs to be parsed is correctly parsed in the current uplink scheduling process, the PHY layer can transmit either or both of the uplink data of the UEs and the uplink data parsing result of the UEs (e.g., parsing result about whether the uplink data is correctly parsed, or a Cyclic redundancy check (CRC) measurement) in packets to the MAC layer, so as to complete the current uplink scheduling process.

In some embodiments, the uplink data parsing method can further include:

At step 307, when the uplink scheduling process is ended or a next uplink scheduling process is started, the PHY layer initializing the first UE record.

The initializing the first UE record can include, for example, emptying the first UE record or setting the parsing result corresponding to the UE in the first UE record to an invalid value or not correctly parsed.

In some embodiments, the uplink data parsing method can further include: the MAC layer determining UEs resident in the logical cell, and transmitting identification information of the UEs to the PHY layer; the PHY layer generating or updating a second UE record according to the identification information of the UEs resident in the logical cell. The second UE record can include cell identifiers of physical cells where the uplink data of all UEs in the logical cell is last correctly parsed.

In the next uplink scheduling process, the PHY layer of the baseband processing unit can parse the uplink data of the UE once again according to the process provided in the above embodiments.

In the above steps, based on a product architecture of the BBU and the RRU of the 4G/5G, and a central unit (CU)/the DU, the HUB, and the RU, the RRU/RU can maintain the conventional Intermediate Frequency (IF) and Radio Frequency (RF) capabilities without increasing demodulation and decoding capabilities of an uplink physical layer (ORAN option 7-2 needs to support a low-phy, the physical layer includes the low-phy and a high-phy, the low-phy is configured for Fast Fourier Transform (FFT) or Inverse Fast Fourier Transform (IFFT)). When the BBU/DU parses the uplink data of each UE, the BBU/DU selects each physical cell to determine whether to parse the uplink data of the UE, instead of traversing each physical cell to parse the uplink data of the same UE. When the uplink data of the UE is correctly parsed in the selected physical cell, the uplink data of the UE would not be parsed repeatedly in other physical cells, reducing the cost of uplink basebands of a merged cell, reducing the number of parsing repetitions and a repetition rate, and reducing the processing load on the baseband processing unit.

In some embodiments, at the step 305, the PHY layer employing the parameter information of the UE to parse the uplink data of the UE to be parsed in the uplink baseband signals corresponding to the plurality of physical cells can include: the PHY layer selecting physical cells in turn from the plurality of physical cells in a preset order, and the PHY layer employing the parameter information of the UE to parse the uplink data of the UE to be parsed in the uplink baseband signals corresponding to the selected physical cell until the plurality of physical cells have been traversed In the above embodiments, the preset order can be predetermined. For example, the above preset order can be determined based on a size of the cell identifiers of the physical cells. Since the uplink data of the UE to be parsed has not yet been parsed in the uplink baseband signal corresponding to any physical cell in the current uplink scheduling process, each physical cell can be traversed in the preset order to parse the uplink data of the UE to be parsed until all physical cells have been traversed. When the uplink data of the UE is successfully parsed, the uplink data of the UE to be parsed would not be parsed in the uplink baseband signal corresponding to other remaining physical cells, so as to conserve processing resources of the baseband processing unit.

The way to determine whether the uplink data is correctly parsed may be in a form of CRC. In some embodiments, the uplink data transmitted by the UE to the base station can include a valid data portion and a CRC measurement. After the PHY layer of the baseband processing unit parses the uplink data of the UE, the PHY layer can perform the CRC on the valid data portion of the uplink data to obtain the CRC measurement of the valid data portion. When the CRC measurement is a preset value (e.g., 0), it is determined that the uplink data of the UE to be parsed is correctly parsed. Otherwise, it is determined that the uplink data of the UE to be parsed is not correctly parsed.

To further conserve processing resources of the baseband processing unit, it can be determined whether the uplink data is in a PUSCH channel of the current physical cell prior to parsing the uplink data of the UE. Whether the uplink data is in the PUSCH channel of the current physical cell can be determined by determining whether PUSCH channel power of the current physical cell exceeds a preset threshold. In some embodiments, before the PHY layer employs the parameter information of the UE to parse the uplink data of the UE to be parsed in the uplink baseband signals corresponding to the selected physical cell, the PHY layer can first determine whether a PUSCH measurement of the UE in the uplink baseband signals corresponding to the selected physical cell is greater than the preset threshold. When the PUSCH measurement is greater than the preset threshold, the PHY layer can employ the parameter information of the UE to parse the uplink data of the UE to be parsed in the uplink baseband signals corresponding to the selected physical cell. When the PUSCH measurement is less than or equal to the preset threshold, the PHY layer may not parse the uplink data of the UE to be parsed in the uplink baseband signals corresponding to the selected physical cell. The above preset threshold can be a Signal-Noise Ratio (SNR) threshold. When the preset threshold is infinitely low, it is equivalent to parsing the UE that has not been correctly parsed in each physical cell.

The PUSCH measurement can be obtained based on either or both of the SNR and a Reference Signal Receiving Power (RSRP).

In this way, it can be determined whether the uplink data of the UE is in the PUSCH channel of one physical cell. When the uplink data of the UE is not in the PUSCH channel, the baseband processing unit would not parse the uplink data of the UE in the physical cell to further conserve processing resources of the baseband processing unit.

Figure 4:
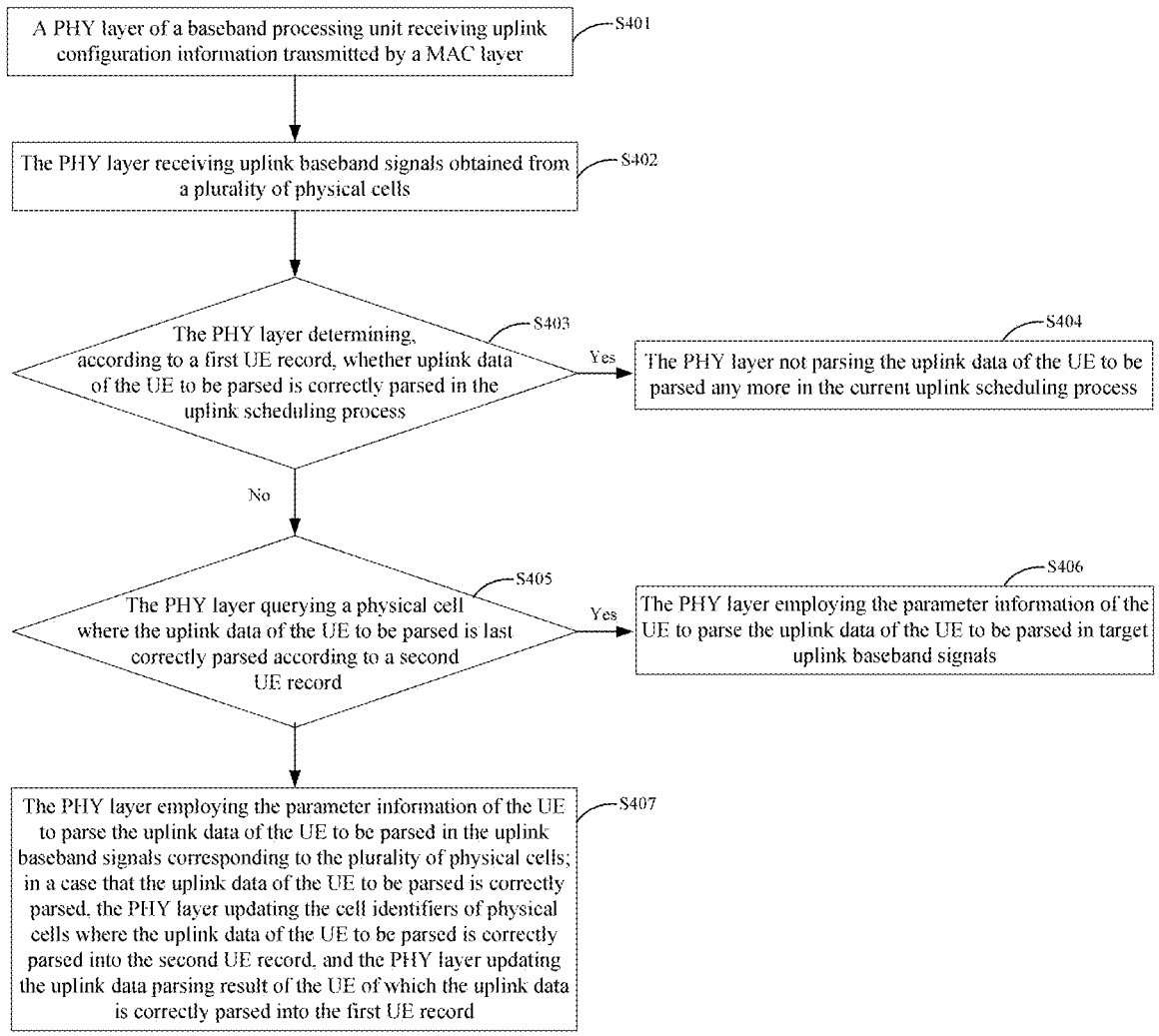
FIG. 4 is a flowchart of an uplink data parsing method in another embodiment of the present disclosure.

The present disclosure provides another uplink data parsing method. FIG. 4 is a flowchart of an uplink data parsing method in another embodiment of the present disclosure. Referring to FIG. 4, the process can include the following steps:

At step 401, in an uplink scheduling process, a PHY layer of a baseband processing unit receiving uplink configuration information transmitted by a MAC layer.

At step 402, the PHY layer receiving uplink baseband signals obtained from a plurality of physical cells.

At step 403, the PHY layer determining, according to a first UE record, whether uplink data of a UE to be parsed is correctly parsed in the uplink scheduling process.

At step 404, when the PHY layer determines that the uplink data of the UE to be parsed is correctly parsed in the uplink scheduling process according to the first UE record, the uplink data of the UE to be parsed being not parsed any more in the uplink scheduling process, and the first UE record including an uplink data parsing result of the UE of which uplink data needs to be parsed in the uplink scheduling process.

At step 405, when the PHY layer determines that the uplink data of the UE to be parsed is not correctly parsed in the uplink scheduling process according to the first UE record, the PHY layer querying a physical cell where the uplink data of the UE to be parsed is last correctly parsed according to a second UE record.

At step 406, when the physical cell is queried where the uplink data of the UE to be parsed is last correctly parsed, the PHY layer employing the parameter information of the UE to parse the uplink data of the UE to be parsed in target uplink baseband signals, the target uplink baseband signals being corresponding to the physical cell where the uplink data of the UE to be parsed is last correctly parsed, and the second UE record including cell identifiers of physical cells where the uplink data of all UEs in the logical cell is last correctly parsed.

At step 407, in a case that the PHY layer queries no physical cell where the uplink data of the UE to be parsed is last correctly parsed according to the second UE record, the PHY layer employing the parameter information of the UE to parse the uplink data of the UE to be parsed in the uplink baseband signals corresponding to the plurality of physical cells; and in a case that the uplink data of the UE to be parsed is correctly parsed, the PHY layer updating the cell identifiers of physical cells where the uplink data of the UE to be parsed is correctly parsed into the second UE record, and the PHY layer updating the uplink data parsing result of the UE of which the uplink data is correctly parsed into the first UE record.

In the above steps, the uplink data of the UE can be parsed in the physical cell where the uplink data of the UE to be parsed is last correctly parsed in a last uplink scheduling process, to further reduce resource consumption of the baseband processing unit.

Figure 5:
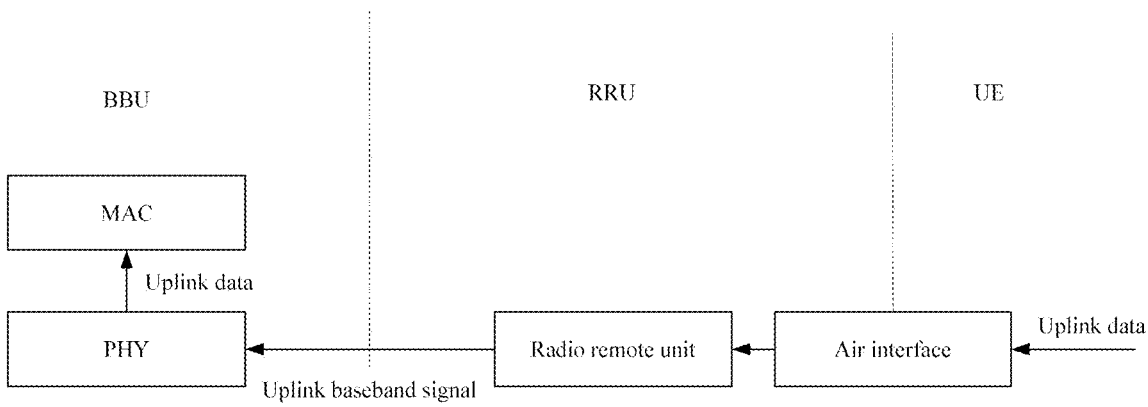
FIG. 5 is a schematic diagram of an uplink data parsing method in an embodiment of the present disclosure.

FIG. 5 is a schematic diagram of an uplink data parsing method in an embodiment of the present disclosure. Referring to FIG. 5, the baseband processing unit (BBU) can have a MAC layer function and a PHY layer function. A mobile terminal (UE) in a physical cell can modulate the uplink data into a RF signal, and the RF signal can be transmitted to the remote radio unit (RRU) corresponding to the physical cell via an air interface. The RRU can process the received RF signal into the uplink baseband signal and transmit the uplink baseband signal to the BBU via the PHY layer. After receiving the uplink baseband signal transmitted from the RRU, the PHY layer of the BBU can parse the uplink data of the UE by the method referring to FIG. 3 or FIG. 4, and transmit the uplink data of the UE to the MAC layer of the BBU.

It should be noted that the steps shown in the above processes or in the flowcharts of the accompanying drawings can be performed in a computer system employing a set of computer-executable instructions. In addition, although a logical order is shown in the flowcharts, the steps shown or described can be executed in an order different from the order herein in some cases.

The present disclosure further provides an electronic device including a processor and a memory that stores a computer program running on the processor. The computer program is executed by the processor to implement the steps of the uplink data parsing method described above.

Alternatively, the electronic device can further include a transmission device and an input and output device. The transmission device is connected to the processor, and the input and output device is connected to the processor.

Alternatively, in the present embodiment, the computer program can be executed by the processor to implement the following steps:

At step 1, in an uplink scheduling process, a PHY layer of a baseband processing unit receiving uplink configuration information transmitted by a MAC layer, and the uplink configuration information including parameter information of a UE of which uplink data needs to be parsed in the uplink scheduling process.

At step 2, the PHY layer receiving uplink baseband signals obtained from a plurality of physical cells.

At step 3, when the according to a first UE record, whether uplink data of the UE to be parsed is correctly parsed in the uplink scheduling process.

At step 4, when the uplink data of the UE to be parsed is correctly parsed in the uplink scheduling process, the uplink data of the UE to be parsed being not parsed any more in the uplink scheduling process, and the first UE record including an uplink data parsing result of the UE of which uplink data needs to be parsed in the uplink scheduling process.

It should be noted that specific instances of the present embodiment can be referred to instances described in the above embodiments and alternative embodiments, and the present embodiment would not be repeated herein.

Furthermore, in conjunction with the uplink data parsing method in the above embodiments, the present disclosure provides a storage medium. The storage medium has stored a computer program, and the computer program is executed by a processor to implement the steps of the uplink data parsing method of any one of the above embodiments.

In summary, the above embodiments or alternative embodiments provided in the present disclosure have the following advantages.

When the uplink data of the UE has already been parsed with correct CRC in a leaning physical cell, the uplink data of the UE would not be parsed in a subsequent physical cell, reducing processing pressure and timing pressure of the physical layer.

The UE that does not need to be parsed in the current physical cell is further filtered out by setting the threshold reasonably, reducing processing pressure and timing pressure of the physical layer.

A conservative or aggressive filtering strategy can be selected by setting the threshold flexibly.

The processing load of uplink baseband merging in a cell merging scene can be reduced, and cell specifications that can be supported by the baseband processing unit can be enhanced.

The embodiments of the present disclosure do not require additional functional modules, such as a centralized scheduler, an uplink physical layer parsing module of RU unit, etc.

The embodiments of the present disclosure do not require transmission of interaction information between the remote radio units and the baseband processing unit, so additional interaction information is not added.

The embodiments of the present disclosure can concentrate on processing within the physical layer of the baseband processing unit without affecting an external interface, which facilitates functional expansion and portability.

Those skilled in the art should understand that the technical features of the above-described embodiments may be combined in any combination. For the sake of brevity of description, not all possible combinations of the technical features in the above embodiments are described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

We claim:

1. An uplink data parsing method, applied to a base station comprising a logical cell merged by a plurality of physical cells, the base station comprising a baseband processing unit and multiple remote radio units connected to the baseband processing unit, the base station being configured to perform PHY layer processing and MAC layer processing in the baseband processing unit, wherein the method comprises:
   in an uplink scheduling process, a PHY layer of the baseband processing unit receiving uplink configuration information transmitted by a MAC layer, wherein the uplink configuration information comprises parameter information of a UE of which uplink data needs to be parsed in the uplink scheduling process;
   the PHY layer receiving uplink baseband signals obtained from the plurality of physical cells; and
   the PHY layer determining, according to a first UE record, whether uplink data of the UE to be parsed is correctly parsed in the uplink scheduling process, wherein if yes, the uplink data of the UE to be parsed being not parsed any more in the uplink scheduling process, wherein the first UE record comprises an uplink data parsing result of the UE of which uplink data needs to be parsed in the uplink scheduling process.

2. The method of claim 1, wherein after the PHY layer determining, according to the first UE record, whether the uplink data of the UE to be parsed is correctly parsed in the uplink scheduling process, the method further comprises:
   if no, the PHY layer querying a physical cell where the uplink data of the UE to be parsed is last correctly parsed according to a second UE record, and employing the parameter information of the UE to parse the uplink data of the UE to be parsed in target uplink baseband signals, wherein the target uplink baseband signals are corresponding to the physical cell where the uplink data of the UE to be parsed is last correctly parsed, the second UE record comprises cell identifiers of physical cells where the uplink data of all UEs in the logical cell is last correctly parsed.

3. The method of claim 2, further comprising:
   in a case that the PHY layer queries no physical cell where the uplink data of the UE to be parsed is last correctly parsed according to the second UE record, the PHY layer employing the parameter information of the UE to parse the uplink data of the UE to be parsed in the uplink baseband signals corresponding to the plurality of physical cells; and in a case that the uplink data of the UE to be parsed is correctly parsed, the PHY layer updating the cell identifiers of physical cells where the uplink data of the UE to be parsed is correctly parsed into the second UE record, and the PHY layer updating the uplink data parsing result of the UE of which the uplink data is correctly parsed into the first UE record.

4. The method of claim 3, wherein the PHY layer employing the parameter information of the UE to parse the uplink data of the UE to be parsed in the uplink baseband signals corresponding to the plurality of physical cells comprises:
   the PHY layer selecting physical cells in turn from the plurality of physical cells in a preset order, and the PHY layer employing the parameter information of the UE to parse the uplink data of the UE to be parsed in the uplink baseband signals corresponding to the selected physical cells until the plurality of physical cells have been traversed.

5. The method of claim 4, wherein the PHY layer employing the parameter information of the UE to parse the uplink data of the UE to be parsed in the uplink baseband signals corresponding to the selected physical cells comprises:
   the PHY layer calculating a PUSCH measurement corresponding to the UE, according to the uplink baseband signals corresponding to the selected physical cells; and
   the PHY layer determining whether the PUSCH measurement is greater than a preset threshold, wherein
     if yes, the PHY layer employing the parameter information of the UE to parse the uplink data of the UE to be parsed in the uplink baseband signals corresponding to the selected physical cells;
     if no, the PHY layer not parsing the uplink data of the UE to be parsed in the uplink baseband signals corresponding to the selected physical cells.

6. The method of claim 5, wherein the PUSCH measurement is obtained based on either or both of a signal-to-noise ratio and reference signal received power.

7. The method of claim 1, further comprising:
   the PHY layer transmitting either or both of the uplink data of the UE to be parsed and the uplink data parsing result of the UE in the uplink scheduling process to the MAC layer, and the PHY layer ending the uplink scheduling process.

8. The method of claim 1, further comprising:
   when the uplink scheduling process is ended or a next uplink scheduling process is started, the PHY layer initializing the first UE record.

9. An electronic device, comprising a processor and a memory that stores a computer program running on the processor, wherein the computer program is executed by the processor to implement the steps of the method of claim 1.

10. The electronic device of claim 9, wherein after the PHY layer determining, according to the first UE record, whether the uplink data of the UE to be parsed is correctly parsed in the uplink scheduling process, the method further comprises:
    if no, the PHY layer querying a physical cell where the uplink data of the UE to be parsed is last correctly parsed according to a second UE record, and employing the parameter information of the UE to parse the uplink data of the UE to be parsed in target uplink baseband signals, wherein the target uplink baseband signals are corresponding to the physical cell where the uplink data of the UE to be parsed is last correctly parsed, the second UE record comprises cell identifiers of physical cells where the uplink data of all UEs in the logical cell is last correctly parsed.

11. The electronic device of claim 10, wherein the method further comprises:
    in a case that the PHY layer queries no physical cell where the uplink data of the UE to be parsed is last correctly parsed according to the second UE record, the PHY layer employing the parameter information of the UE to parse the uplink data of the UE to be parsed in the uplink baseband signals corresponding to the plurality of physical cells; and in a case that the uplink data of the UE to be parsed is correctly parsed, the PHY layer updating the cell identifiers of physical cells where the uplink data of the UE to be parsed is correctly parsed into the second UE record, and the PHY layer updating the uplink data parsing result of the UE of which the uplink data is correctly parsed into the first UE record.

12. The electronic device of claim 11, wherein the PHY layer employing the parameter information of the UE to parse the uplink data of the UE to be parsed in the uplink baseband signals corresponding to the plurality of physical cells comprises:
the PHY layer selecting physical cells in turn from the plurality of physical cells in a preset order, and the PHY layer employing the parameter information of the UE to parse the uplink data of the UE to be parsed in the uplink baseband signals corresponding to the selected physical cells until the plurality of physical cells have been traversed.

13. The electronic device of claim 12, wherein the PHY layer employing the parameter information of the UE to parse the uplink data of the UE to be parsed in the uplink baseband signals corresponding to the selected physical cells comprises:
the PHY layer calculating a PUSCH measurement corresponding to the UE, according to the uplink baseband signals corresponding to the selected physical cells; and
the PHY layer determining whether the PUSCH measurement is greater than a preset threshold, wherein
if yes, the PHY layer employing the parameter information of the UE to parse the uplink data of the UE to be parsed in the uplink baseband signals corresponding to the selected physical cells;
if no, the PHY layer not parsing the uplink data of the UE to be parsed in the uplink baseband signals corresponding to the selected physical cells.

14. The electronic device of claim 13, wherein the PUSCH measurement is obtained based on either or both of a signal-to-noise ratio and reference signal received power.

15. The electronic device of claim 9, wherein the method further comprises:
the PHY layer transmitting either or both of the uplink data of the UE to be parsed and the uplink data parsing result of the UE in the uplink scheduling process to the MAC layer, and the PHY layer ending the uplink scheduling process.

16. The electronic device of claim 9, wherein the method further comprises:
when the uplink scheduling process is ended or a next uplink scheduling process is started, the PHY layer initializing the first UE record.

17. A non-transitory storage medium having stored a computer program, wherein the computer program is executed by a processor to implement the steps of the method of claim 1.

18. The non-transitory storage storage medium of claim 17, wherein after the PHY layer determining, according to the first UE record, whether the uplink data of the UE to be parsed is correctly parsed in the uplink scheduling process, the method further comprises:
if no, the PHY layer querying a physical cell where the uplink data of the UE to be parsed is last correctly parsed according to a second UE record, and employing the parameter information of the UE to parse the uplink data of the UE to be parsed in target uplink baseband signals, wherein the target uplink baseband signals are corresponding to the physical cell where the uplink data of the UE to be parsed is last correctly parsed, the second UE record comprises cell identifiers of physical cells where the uplink data of all UEs in the logical cell is last correctly parsed.

19. The non-transitory storage storage medium of claim 18, wherein the method further comprises:
in a case that the PHY layer queries no physical cell where the uplink data of the UE to be parsed is last correctly parsed according to the second UE record, the PHY layer employing the parameter information of the UE to parse the uplink data of the UE to be parsed in the uplink baseband signals corresponding to the plurality of physical cells; and in a case that the uplink data of the UE to be parsed is correctly parsed, the PHY layer updating the cell identifiers of physical cells where the uplink data of the UE to be parsed is correctly parsed into the second UE record, and the PHY layer updating the uplink data parsing result of the UE of which the uplink data is correctly parsed into the first UE record.

20. The non-transitory storage storage medium of claim 19, wherein the PHY layer employing the parameter information of the UE to parse the uplink data of the UE to be parsed in the uplink baseband signals corresponding to the plurality of physical cells comprises:
the PHY layer selecting physical cells in turn from the plurality of physical cells in a preset order, and the PHY layer employing the parameter information of the UE to parse the uplink data of the UE to be parsed in the uplink baseband signals corresponding to the selected physical cells until the plurality of physical cells have been traversed.

* * * * *